United States Patent
Calleija et al.

(10) Patent No.: US 12,528,482 B2
(45) Date of Patent: Jan. 20, 2026

(54) METHODS AND SYSTEMS FOR AUTOMATIC INTROSPECTIVE PERCEPTION

(71) Applicant: Waymo LLC, Mountain View, CA (US)

(72) Inventors: Mark Calleija, Los Altos, CA (US); Clayton Kunz, Mill Valley, CA (US); Matthew Langford, Mountain View, CA (US); Ramadev Hukkeri, Pittsburgh, PA (US); Daniel Rothenberg, Frederick, CO (US)

(73) Assignee: Waymo LLC, Mountain View, CA (US)

( * ) Notice: Subject to any disclaimer, the term of this patent is extended or adjusted under 35 U.S.C. 154(b) by 325 days.

(21) Appl. No.: 18/173,150

(22) Filed: Feb. 23, 2023

(65) Prior Publication Data

US 2024/0286626 A1 Aug. 29, 2024

(51) Int. Cl.
*B60W 50/06* (2006.01)
*B60W 60/00* (2020.01)

(52) U.S. Cl.
CPC .......... *B60W 50/06* (2013.01); *B60W 60/001* (2020.02); *B60W 2420/408* (2024.01); *B60W 2554/80* (2020.02); *B60W 2555/20* (2020.02)

(58) Field of Classification Search
CPC ............... B60W 50/06; B60W 60/001; B60W 2555/20; B60W 2554/80; B60W 2420/408
See application file for complete search history.

(56) References Cited

U.S. PATENT DOCUMENTS

| | | |
|---|---|---|
| 9,355,319 B2 | 5/2016 | Jang |
| 10,471,904 B2 | 11/2019 | Delp |
| 10,489,686 B2 | 11/2019 | Vallespi-Gonzalez |
| 11,092,694 B2 | 8/2021 | Cui |
| 11,314,974 B2 | 4/2022 | Ramaiah |
| 2020/0019173 A1 | 1/2020 | Chen |
| 2021/0309248 A1 | 10/2021 | Choe |
| 2022/0129362 A1* | 4/2022 | Beijbom ............... B60W 50/04 |
| 2022/0355794 A1 | 11/2022 | Zwicky |

(Continued)

FOREIGN PATENT DOCUMENTS

WO 2019185359 A1 10/2019

OTHER PUBLICATIONS

Liang et al., "Deep Continuous Fusion for Milti=Sensor 3D Object Detection", Computer Vision Foundation (2018).

*Primary Examiner* — Kenneth M Dunne
(74) *Attorney, Agent, or Firm* — McDonnell Boehnen Hulbert & Berghoff LLP

(57) ABSTRACT

Example embodiments relate to self-supervisory and automatic response techniques and systems. A computing system may use sensor data from an autonomous vehicle sensor to detect an object in the environment of the vehicle as the vehicle navigates a path. The computing system may then determine a detection distance between the object and the sensor responsive to detecting the object. The computing system may then perform a comparison between the detection distance and a baseline detection distance that depends on one or more prior detections of given objects that are in the same classification group as the object. The computing system may then adjust a control strategy for the vehicle based on the comparison.

20 Claims, 11 Drawing Sheets

(56) References Cited

U.S. PATENT DOCUMENTS

| | | | | |
|---|---|---|---|---|
| 2022/0390612 A1* | 12/2022 | Wang | ................ | G01S 7/497 |
| 2023/0141561 A1* | 5/2023 | Hagvall | ................ | G06F 17/18 |
| | | | | 701/23 |
| 2023/0356714 A1* | 11/2023 | Baba | ................ | G08G 1/16 |
| 2024/0010200 A1* | 1/2024 | Gonzalez Bautista | ................ | |
| | | | | B60W 50/06 |
| 2024/0051553 A1* | 2/2024 | Leitch | ................ | G01S 13/931 |

* cited by examiner

METHODS AND SYSTEMS FOR AUTOMATIC INTROSPECTIVE PERCEPTION

BACKGROUND

Advancements in computing, sensors, and other technologies have enabled vehicles to safely navigate between locations autonomously, i.e., without requiring input from a human driver. By processing sensor measurements of the surrounding environment in near real-time, an autonomous vehicle can safely transport passengers or objects (e.g., cargo) between locations while avoiding obstacles, obeying traffic requirements, and performing other actions that are typically conducted by the driver. Shifting both decision-making and control of the vehicle over to vehicle systems can allow the vehicle's passengers to devote their attention to tasks other than driving.

SUMMARY

Example embodiments relate to self-supervisory and automatic response techniques that increase performance of a perception system by actively comparing the actual detection performance of one or multiple target classes to one or more performance baseline priors developed for each target class. Comparing the actual detection performance to baseline priors can produce results that inform how well the perception may be performing and enable the vehicle to adjust behavior and trigger other operations in real-time, such as cleaning or calibration of sensors.

Accordingly, a first example embodiment describes a method. The method involves receiving, at a computing system and from a sensor coupled to a vehicle, sensor data representing an environment of the vehicle as the vehicle navigates a path. The method also involves detecting, based on the sensor data, an object in the environment and, responsive to detecting the object, determining a detection distance between the object and the sensor. The method also involves performing, by the computing system, a comparison between the detection distance and a baseline detection distance. The baseline detection distance depends on one or more prior detections of given objects that are in a classification group comprising the object. The method further involves adjusting, based on the comparison, a control strategy for the vehicle.

Another example embodiment describes a system. The system includes a vehicle having a sensor and a computing device. The computing device is configured to receive, from the sensor, sensor data representing an environment of the vehicle as the vehicle navigates a path, detect, based on the sensor data, an object in the environment, and determine a detection distance between the object and the sensor responsive to detecting the object. The computing device is also configured to perform a comparison between the detection distance and a baseline detection distance, where the baseline detection distance depends on one or more prior detections of given objects that are in a classification group comprising the object. The computing device is further configured to adjust, based on the comparison, a control strategy for the vehicle.

An additional example embodiment describes a non-transitory computer-readable medium configured to store instructions, that when executed by a computing device, causes the computing device to perform operations. The operations involve receiving, from a sensor coupled to a vehicle, sensor data representing an environment of the vehicle as the vehicle navigates a path. The operations also involve detecting, based on the sensor data, an object in the environment and, responsive to detecting the object, determining a detection distance between the object and the sensor. The operations also involve performing a comparison between the detection distance and a baseline detection distance. The baseline detection distance depends on one or more prior detections of given objects that are in a classification group comprising the object. The operations further involves adjusting, based on the comparison, a control strategy for the vehicle.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
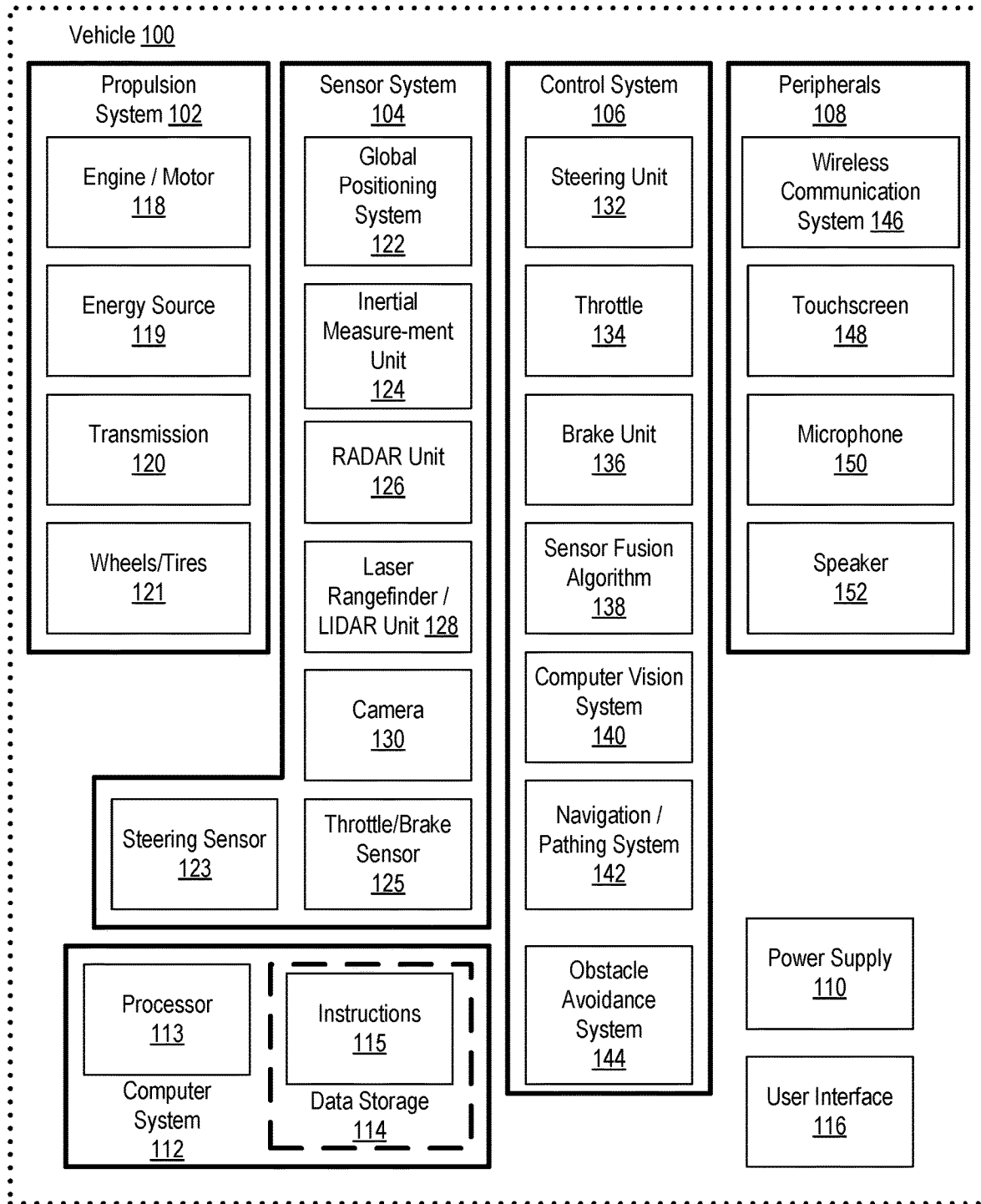
FIG. 1 is a functional block diagram illustrating a vehicle, according to one or more example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Example embodiments relate to techniques and systems for performing automatic introspection of perceptual systems, such as autonomous vehicle perception systems and other types of perceptions that use sensor data to make inferences about properties of an environment. In general, perception is the organization, identification, and interpretation of sensory information in order to represent and understand the environment. A vehicle may incorporate a disclosed system to increase object detection accuracy and interpretation during navigation. In particular, the system can improve the performance of the vehicle perception system by comparing the actual detection parameters obtained via sensor measurements of one or multiple target classes to one or more performance baseline priors of each target class. The system can then use the results of the comparisons to adjust performance of the vehicle and trigger other operations that may increase the accuracy of the perception system or safety of the vehicle.

Automatic introspection of the performance of a perception system may involve analyzing the actual detection parameters of objects relative to baseline detection parameters generated based on type of objects (i.e., classification groups). With objects organized according to classification groups, each baseline prior is generated to be specific to a certain type of object, which allows the introspection of the perception system's performance to be available across different types of objects experienced during navigation. Furthermore, characterizing and adjusting the vehicle performance based on frequently detected objects (e.g. signs on a Freeway) enables the vehicle to adapt its performance prior to encountering more rare object examples (e.g. pedestrians on a Freeway). For instance, disclosed techniques enable testing a perception system's performance when detecting vehicles, pedestrians, and other types of targets encountered during navigation. As such, some example classification groups can include other vehicles, pedestrians, trees, lane markers, traffic signals, and other types of objects that are encountered during navigation. In addition, in some example embodiments, disclosed techniques may be performed based on baseline detection parameters generated for subgroups within each classification group. For instance, a system may use one set of baseline detection parameters generated for trucks when analyzing real-world truck detections by the perception system and a different set of baseline detection parameters generated for passenger vehicles when analyzing vehicle detections. Overall, the arrangement of objects based on classification groups and subgroups can allow baseline detection parameters to be customized for evaluating a perception system's ability to detect and understand specific objects in the environment.

As the perception system detects and classifies different types of objects and surfaces using incoming sensor data from vehicle sensors, the system can analyze detection parameters to evaluate the perception system's performance in real-time. In particular, the system can evaluate how well the perception system is detecting and classifying the different types of objects based on prior baseline detection parameters generated to enhance performance in the current conditions of the environment. When comparisons to one or multiple baseline priors show that the perception system is less accurate in some way, the system may then adjust the behavior of the vehicle in-real time and/or trigger other operations to increase the perception system's performance. For example, the system can slow down, speed up or trigger calibration and/or cleaning processes that may enable sensors to capture and provide measurements that enable the perception system to more accurately interpret the surrounding environment.

Disclosed operations and systems can vary across example embodiments. In some cases, an example system is implemented onboard a vehicle and programmed to continuously query different factors, such as how well is the perception system is detecting various objects in the scene, how do the detection parameters of the objects compare to how well the system should be detecting the objects, and based on answers to the first two queries, how the autonomous vehicle should be driving currently. The system can analyze one or multiple detection parameters relative to baseline detection parameters as the perception system detects, interprets, and classifies objects using sensor data obtained from various vehicle sensors. By using class-specific baseline detection parameters, the system can identify when performance is lagging in real-time and apply corrective actions to increase subsequent performance by the perception system. As an example result, disclosed systems and techniques can enhance autonomous navigation by guarding against several key failure or degradation modes, such as intrinsic or extensions sensor geometric or intensity calibration errors, latency or poor performance in the stack, weather effects (e.g., rain or fog effects visibility), and sensor aperture fouling (e.g., due to bugs). In other examples, the system may periodically perform disclosed techniques to check performance of the perception system and adjust vehicle control strategy as an example result.

By way of an example, while navigating a path in an environment, an autonomous vehicle often detects other vehicles and other objects in the surrounding environment using sensor data from vehicle sensors. Upon detecting another vehicle positioned at approximately 150 meters in front of the vehicle, an automatic introspective system may compare the detection distance (i.e., 150 meters) associated with initially detecting the other vehicle with a baseline detection distance. In some cases, the baseline detection distance is generated based on prior detections of other vehicles and can be used by the system to evaluate if the 150 meter initial detection of the other vehicle by the perception system is consistent with performance expectations or if there may be an issue that requires some form of remedy. For instance, if the baseline detection distance is approximately 145 meters, the system may determine that the comparison between the baseline detection distance (145 m) and the actual detection distance (150 m) of the other vehicle yields a low difference (approximately 3.3 percent difference). As an example result, the system may determine that the perception system is functioning accurately and refrain from triggering any operations to increase accuracy. Conversely, if the baseline detection distance is 180 meters, the comparison between the baseline detection distance (180 m) and the actual detection distance (150 m) results in a greater difference (approximately 18 percent difference). As an example result, the system may trigger one or more operations to increase the performance of the perception system, such as cleaning one or multiple sensors, calibrating one or multiple sensors, and/or adjusting vehicle behavior (e.g., decreasing speed).

The system may evaluate one or multiple detection parameters associated with the actual detection of an object in the environment as part of the analysis of the perception system's performance. For instance, the system can evaluate the actual detection distance, the detection time, the localization accuracy, and/or the classification confidence associated with an object detected in sensor data from one or multiple vehicle sensors. The baseline detection parameters are based on the type of object detected in the environment in some examples and can vary based on the type of object actually detected within the environment. In some embodiments, the system may evaluate multiple detection parameters as a group when analyzing the accuracy of the perception system. In other embodiments, the system may analyze individual detection parameters in a series or simultaneously to evaluate the performance of the perception system.

In addition, in some embodiments, the system may use one or multiple thresholds when evaluating the results of a comparison between an actual detection parameter and a baseline detection parameter. For instance, the system may trigger certain actions when the numeric difference (or percent difference) exceeds a threshold difference and other actions when the difference falls below the threshold difference.

Disclosed techniques involve using one or multiple baseline detection parameters to evaluate current performance of the perception system. As such, these baseline detection parameters can be generated or obtained in various ways within examples. For instance, the vehicle can generate baseline detection parameters based on recent evaluation of the environment by the vehicle perception system and/or obtain the baseline detection parameters from other sources, such as other vehicles located within a threshold distance of the vehicle or from a remote computing device. In addition, the baseline detection parameters may also be stored locally and/or remotely from a vehicle.

In some cases, a disclosed system may use one or multiple reference tables to obtain baseline parameters based on the objects detected in a vehicle's environment. For instance, the reference table can store various baseline parameters for a variety of classification groups, such as traffic signals, vehicles, pedestrians, lane markings, etc. In some examples, the reference table may be a discrete lookup table that the system can use for performance mapping. A reference table can be populated with baseline detection parameters based on prior detections from the vehicle, other vehicles, and/or a remote system. In some cases, the baseline detection parameters have a limited duration of use before being replaced by new baseline detection parameters generated locally by the vehicle and/or obtained from another source. This way, the baseline detection parameters can be updated over time to better fit the environment of the vehicle.

In some embodiments, the baseline parameters can also be obtained via a machine learned model. For instance, an onboard computing system or a remote device may provide sensor data into a training interface, which uses the sensor data to generate various baseline detection parameters via machine learning. The baseline detection parameters can be generated based on different classification groups and enable a disclosed system to analyze different detection parameters, such as detection distance, localization accuracy, detection time, and classification confidence. In other cases, various performance interpolation methods can be used to provide a continuous lookup. In addition, in some cases, baseline detection parameters can depend on one or more weather conditions within the environment. As such, the system may generate baseline detection parameters for subsequent use to evaluate the perception system's performance over time. The system may periodically or continuously update baseline detection parameters, which can allow the baseline detection parameters to adjust according to changes in the environment (e.g., changes in the weather).

In some examples, the system may use the results of comparisons between one or multiple actual detection parameters and baseline detection parameters to adjust the performance of the vehicle by triggering one or more control responses, such as slowing down, speeding up, pulling over, cleaning sensors, recalibrating sensors, checking weather forecast, and/or detecting sensor aperture fouling (e.g., due to condensation, insects, etc.). The system may apply different weights to the comparisons based on data modeling and/or environment conditions. In addition, various objects can be used to perform disclosed techniques. For instance, a system may use vehicles, pedestrians, signs, poles, line markings, traffic lights, overhead street lights, vehicle headlights, vehicle tail-lights, traffic control devices (e.g., traffic cones), and trees, among others. In some examples, the system is able to detect if the vehicle has a clear line of sight on a detection. For instance, the system may be able to detect if the detection was a true/fair test of performance compared to if the target simply appeared from around a corner out of nowhere.

In some examples, the system (or another vehicle system) may use at least one multi-dimensional inference model when determining and implementing control strategy for the vehicle. In practice, the multi-dimensional inference model factors the joint relationship between multiple environmental parameters, such as wind and rain, when determining control strategy for the vehicle. As an example, the model may output a first control response when wind is detected above a threshold wind level and output a second control response when a wet road is detected. The model may further output a third control response when high winds above the threshold wind level and the wet road are both detected. In particular, the third control response may be an amplified strategy relative to the first and the second control responses since both weather conditions are detected. For example, the system may control the vehicle more conservatively (e.g., reduce speed and maintain a larger buffer of space relative to other vehicles and objects in the surrounding environment) when detecting a combination of multiple environmental parameters in the environment. In some cases, the system may use one or more motion parameters or limits (e.g., speed or acceleration) that can be used in real-time when using the model to factor multiple weather conditions detected in the environment. Some example environment conditions that may be factored include wind, sun level and corresponding impact on sensor data, precipitation conditions, road conditions (e.g., dry or wet roads), which can then be considered in addition to surrounding traffic, the vehicle's current speed and acceleration, target destination, type of road (e.g., urban or freeway) and/or other factors when determining near term and subsequent control strategies for the vehicle. As such, the system may amplify control strategies when multiple factors indicate difficult driving conditions.

By way of an example, an onboard vehicle system may obtain information about multiple weather conditions detected in the environment. For instance, the system may use sensor data from onboard sensors (e.g., a wind sensor and cameras) to detect the weather conditions. Other sensors can be used to determine weather conditions of the local environment, such as lidar and radar. For instance, radar and/or lidar can be used to detect fog, precipitation, sunny conditions, the condition of the roads, and/or other weather conditions as the vehicle navigates toward its destination. In some cases, the system may also receive information from external devices, such as a remote weather computing platform that provides weather information based on the vehicle's location. The system may use one or multiple multi-dimensional inference models that outputs different control strategies based on the combination of weather conditions detected. For instance, fog and wet roads may cause the model to output a control strategy that limits the vehicle's speed and increases the buffer of space that the vehicle maintains during navigation. In addition, the control strategy may also require slower performance of turns.

In some examples, the multi-dimensional inference model is used by vehicle systems during an autonomous planning stage. For instance, the vehicle systems may input sensor data into the model and obtain an output that predicts a different control strategy for the vehicle is needed relative to the typical control strategy used in optimal weather conditions for navigation. As an example, the control strategy can be adjusted based on current conditions or upcoming weather conditions that are predicted based on sensor data and/or information received from an external source. As such, the model can be used in real-time and also for predictive planning.

In some examples embodiments, passenger vehicles may perform disclosed techniques. Example passenger vehicles include cars, sports utility vehicles (SUVs), vans, trucks, electric vehicles (e.g., battery electric vehicles (BEVs), plug-in hybrid electric vehicles (PHEVs), and public transportation vehicles (e.g., buses, trains, and streetcars).

In some example embodiments, a vehicle performing disclosed techniques may be a Class 8 truck (of a gross vehicle weight rating (GVWR) over 33,000 lbs.), including, for example, tractor trailer trucks, single-unit dump trucks, as well as non-commercial chassis fire trucks. Such vehicles may generally have three or more axles. Other types of vehicles can perform disclosed techniques.

Referring now to the figures, FIG. 1 is a functional block diagram illustrating example vehicle 100, which may be configured to operate fully or partially in an autonomous mode. More specifically, vehicle 100 may operate in an autonomous mode without human interaction (or reduced human interaction) through receiving control instructions from a computing system (e.g., a vehicle control system). As part of operating in the autonomous mode, vehicle 100 may use sensors to detect and possibly identify objects of the surrounding environment in order to enable safe navigation. In some implementations, vehicle 100 may also include subsystems that enable a driver (or a remote operator) to control operations of vehicle 100.

As shown in FIG. 1, vehicle 100 includes various subsystems, such as propulsion system 102, sensor system 104, control system 106, one or more peripherals 108, power supply 110, computer system 112, data storage 114, and user interface 116. In other examples, vehicle 100 may include more or fewer subsystems. The subsystems and components of vehicle 100 may be interconnected in various ways (e.g., wired or wireless connections). In addition, functions of vehicle 100 described herein can be divided into additional functional or physical components, or combined into fewer functional or physical components within implementations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some implementations, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some implementations, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example implementations. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar unit 126, laser rangefinder/lidar unit 128, camera 130, steering sensor 123, and throttle/brake sensor 125, among other possible sensors. In some implementations, sensor system 104 may also include sensors configured to monitor internal systems of the vehicle 100 (e.g., $O_2$ monitors, fuel gauge, engine oil temperature, condition of brakes).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar unit 126 may represent one or more systems configured to use radio signals to sense objects, including the speed and heading of the objects, within the local environment of vehicle 100. As such, radar unit 126 may include antennas configured to transmit and receive radar signals as discussed above. In some implementations, radar unit 126 may correspond to a mountable radar system configured to obtain measurements of the surrounding environment of vehicle 100. For example, radar unit 126 can include one or more radar units configured to couple to the underbody of a vehicle.

Laser rangefinder/lidar 128 may include one or more laser sources, a laser scanner, and one or more detectors, among other system components, and may operate in a coherent mode (e.g., using heterodyne detection) or in an incoherent detection mode. Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some implementations, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some implementations, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some implementations, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., stop lights, road way boundaries, etc.), and obstacles. As such, computer vision system 140 may use object recognition, Structure from Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as CDMA, EVDO, GSM/GPRS, or 4G cellular communications, such as WiMAX or LTE. Alternatively, wireless communication system 146 may communicate with a wireless local area network (WLAN) using WiFi or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some implementations. For instance, power supply 110 may include one or more batteries configured to provide electrical power. Vehicle 100 may also use other types of power supplies. In an example implementation, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory computer readable medium, such as data storage 114. In some implementations, computer system 112 may represent a plurality of computing devices that may serve to control individual components or subsystems of vehicle 100 in a distributed fashion.

In some implementations, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar unit 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100, i.e., wireless communication system 146, computer system 112, data storage 114, and user interface 116, as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

Figure 2A:
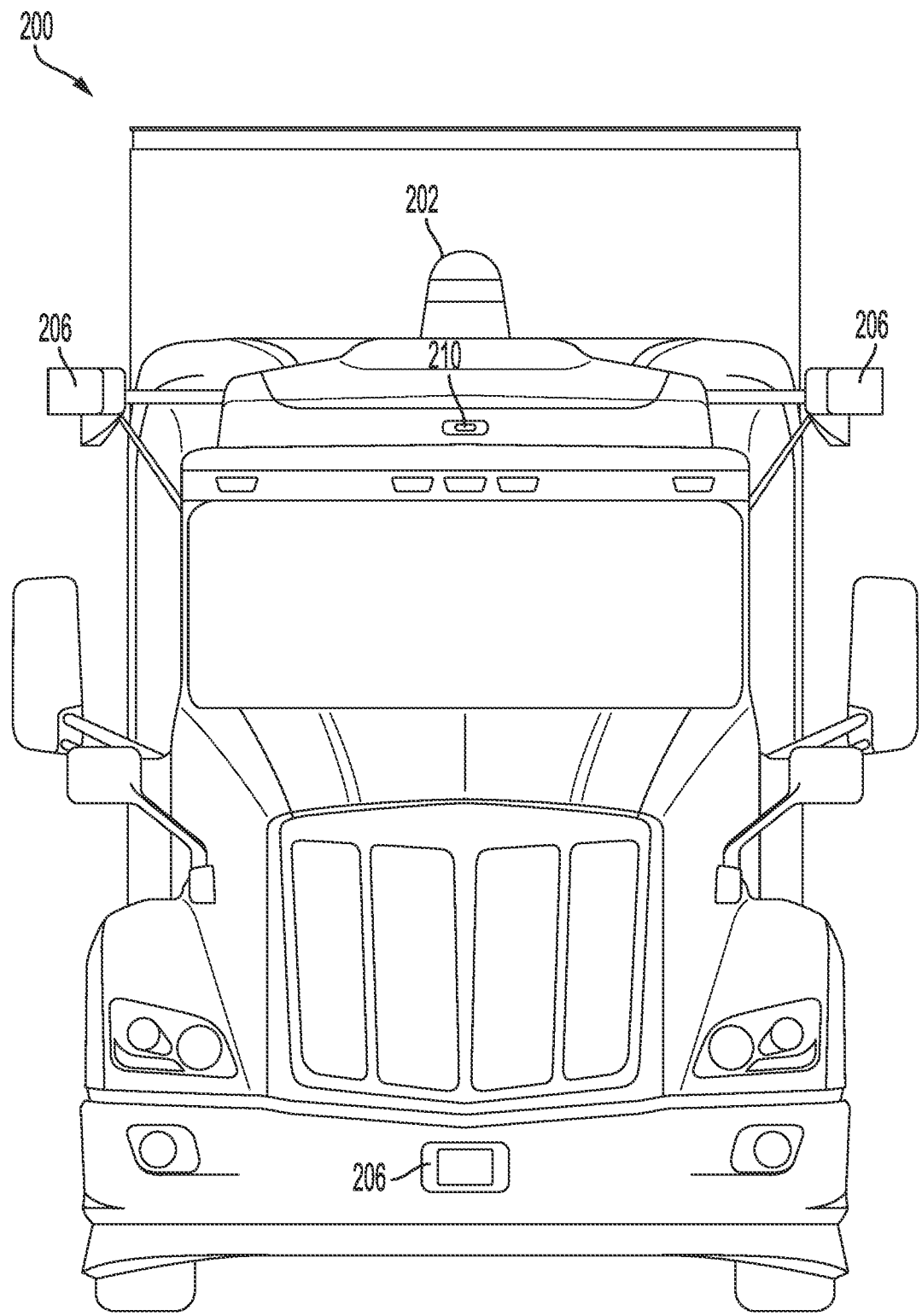
FIG. 2A illustrates a front view of a vehicle, according to one or more example embodiments.
Figure 2B:
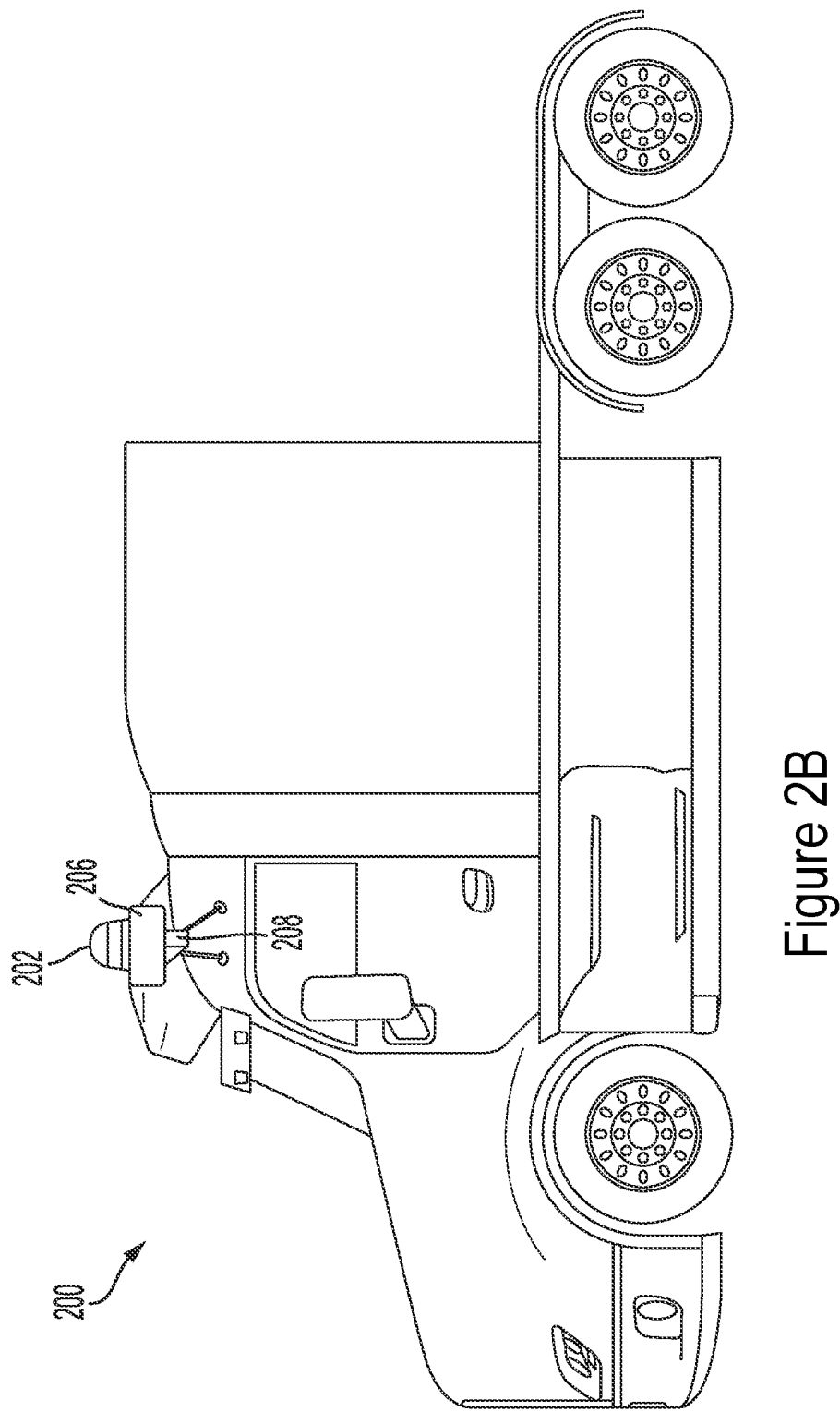
FIG. 2B illustrates a side view of a vehicle, according to one or more example embodiments.
Figure 2C:
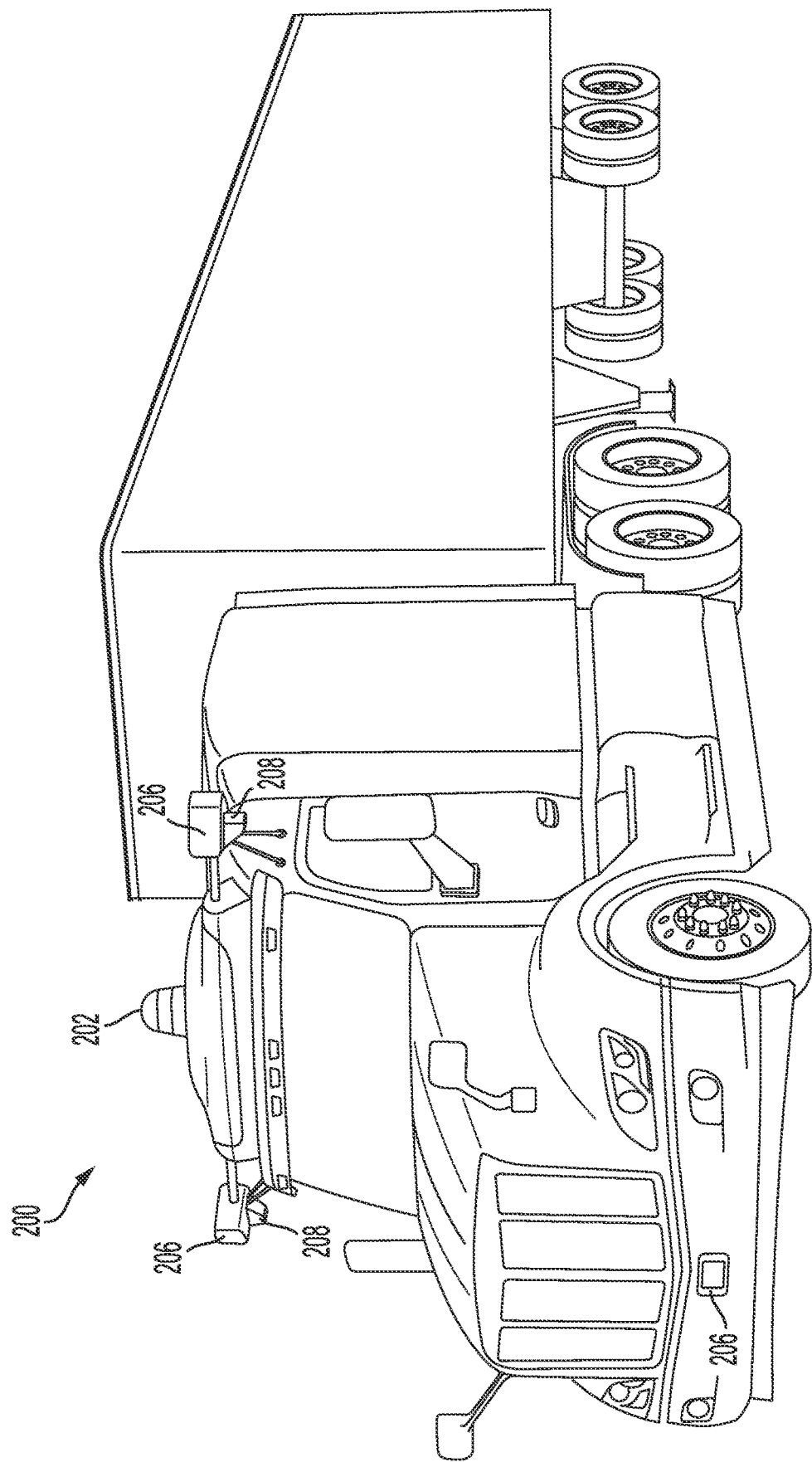
FIG. 2C illustrates a perspective view of a vehicle, according to one or more example embodiments.
Figure 2D:
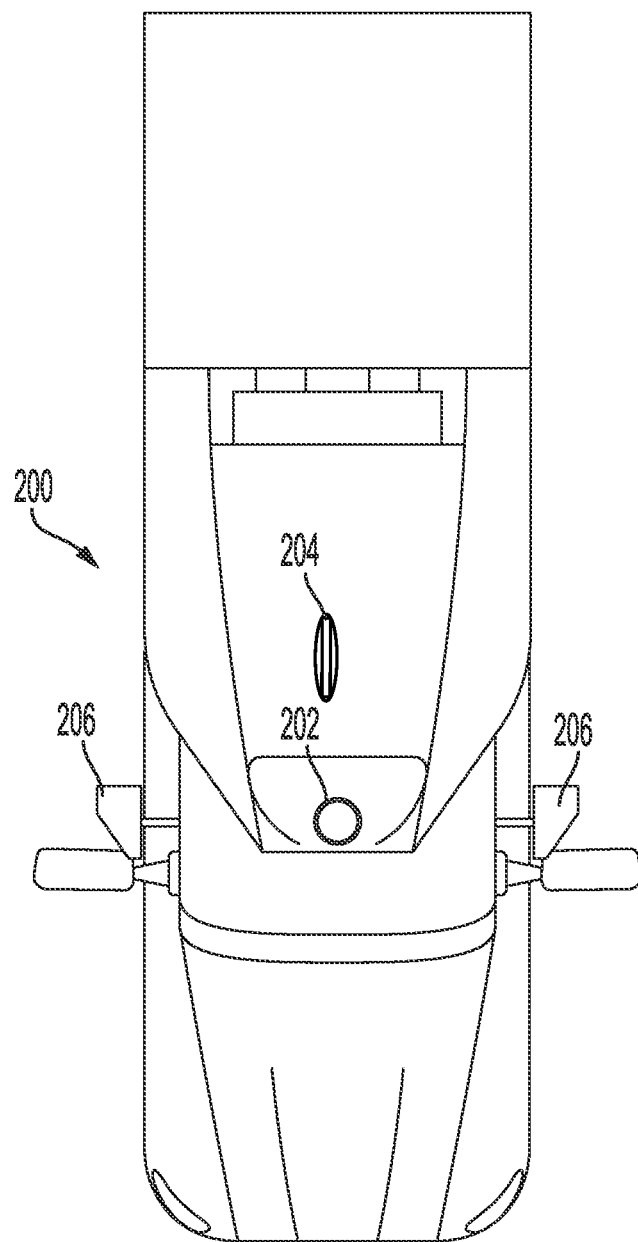
FIG. 2D illustrates a top view of a vehicle, according to one or more example embodiments.

FIG. 2A illustrates a front view of vehicle 200, FIG. 2B illustrates a side view of vehicle 200, FIG. 2C illustrates a perspective view of vehicle 200, and FIG. 2D illustrates a top view of vehicle 200. As such, FIGS. 2A-2D together illustrate an example physical configuration of vehicle 200, which may represent one possible physical configuration of vehicle 100 described in reference to FIG. 1. Depending on the embodiment, vehicle 200 may include sensor unit 202, wireless communication system 204, radar unit 206, lidar units 208, and camera 210, among other possible components. For instance, vehicle 200 may include some or all of the elements of components described in FIG. 1. Although vehicle 200 is depicted in FIG. 2 as a semi-truck, vehicle 200 can have other configurations within examples, such as a car, a van, a motorcycle, a bus, a shuttle, a golf cart, an off-road vehicle, robotic device, a farm vehicle, or other vehicles pulling a trailer among other possible examples.

Sensor unit 202 may include one or more sensors configured to capture information of the surrounding environment of vehicle 200. For example, sensor unit 202 may include any combination of cameras, radars, lidars, range finders, radio devices (e.g., Bluetooth and/or 802.11), and acoustic sensors, among other possible types of sensors. In some implementations, sensor unit 202 may include one or more movable mounts operable to adjust the orientation of sensors in sensor unit 202. For example, the movable mount may include a rotating platform that can scan sensors so as to obtain information from each direction around vehicle 200. The movable mount of sensor unit 202 may also be movable in a scanning fashion within a particular range of angles and/or azimuths.

In some implementations, sensor unit 202 may include mechanical structures that enable sensor unit 202 to be mounted atop the roof of a truck. Additionally, other mounting locations are possible within examples.

Wireless communication system 204 may have a location relative to vehicle 200 as depicted in FIG. 2D, but can also have different locations. Wireless communication system 204 may include one or more wireless transmitters and one or more receivers that may communicate with other external or internal devices. For example, wireless communication system 204 may include one or more transceivers for communicating with a user's device, other vehicles, and roadway elements (e.g., signs, traffic signals), among other possible entities. As such, vehicle 200 may include one or more vehicular communication systems for facilitating communications, such as dedicated short-range communications (DSRC), radio frequency identification (RFID), and other proposed communication standards directed towards intelligent transport systems. Communication system 204 may include a cellular or wireless data connection. The communication system 204 may be configured to communicate with a remote computing system. The remote computing system may be configured to provide instructions and/or data to vehicle 200 to aid in its autonomous operation.

Vehicle 200 may include several radar units 206 at various locations. In one example, vehicle 200 may include a radar unit located on each of the front and back bumpers of the cab portion. Additionally, vehicle 200 may include two radar units located on each side of vehicle 200 near the side-view mirrors. The two radar units on the sides of the vehicle may be positioned so that one images a forward right section, one images a forward left section, one images a rear right section, and one images a rear left section. Each radar unit may be configured to transmit and receive radar signals over an angular region defined by a beamwidth of the radar unit. In some examples, each radar unit may be able to perform beam steering on transmit or receive beams. By using beam steering, a radar unit may be able to interrogate a predefined angular direction.

Vehicle 200 may also include lidar units 208 mounted in various locations. For example, lidar units 208 may also be mounted on the sides of vehicle 200 near the rear-view mirrors. Lidar units 208 may be configured to transmit and receive light signals from the region around the vehicle. Lidar units 208 may be able to image the region around vehicle 200 from which light reflections are received.

Camera 210 may have various positions relative to vehicle 200, such as a location above a front windshield of vehicle 200. As such, camera 210 may capture images of the environment. For instance, camera 210 may capture images from a forward-looking view with respect to vehicle 200, but other mounting locations (including movable mounts) and viewing angles of camera 210 are possible within implementations. In some examples, camera 210 may correspond to one or more visible light cameras, but can also be other types of cameras (e.g., infrared sensor). Camera 210 may also include optics that may provide an adjustable field of view.

Figure 3:
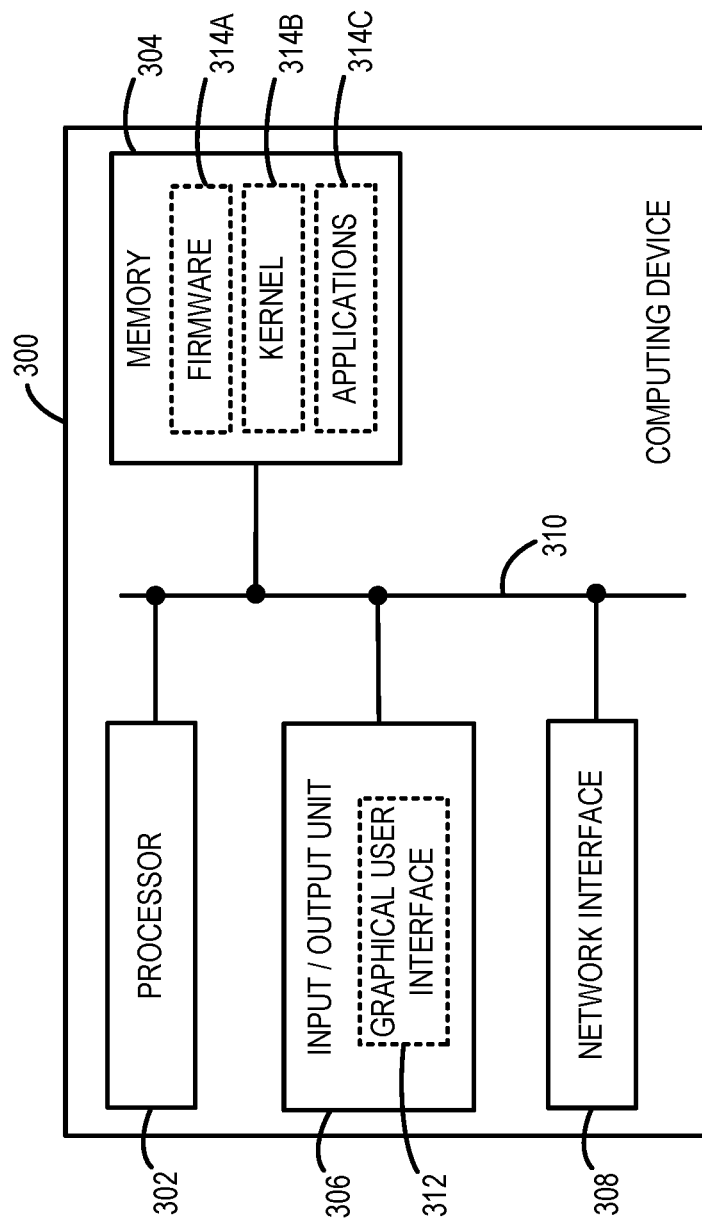
FIG. 3 is a functional block diagram illustrating a computing device, according to one or more example embodiments.

FIG. 3 is a simplified block diagram exemplifying computing device 300, illustrating some of the components that could be included in a computing device arranged to operate in accordance with the embodiments herein. Computing device 300 could be a client device (e.g., a device actively operated by a user (e.g., a remote operator)), a server device (e.g., a device that provides computational services to client devices), or some other type of computational platform. In some embodiments, computing device 300 may be implemented as computer system 112, which can be located on vehicle 100 and perform processing operations related to vehicle operations. For example, computing device 300 can be used to process sensor data received from sensor system 104. Alternatively, computing device 300 can be located remotely from vehicle 100 and communicate via secure wireless communication. For example, computing device 300 may operate as a remotely positioned device that a remote human operator can use to communicate with one or more vehicles.

In the example embodiment shown in FIG. 3, computing device 300 includes processing system 302, memory 304, input/output unit 306 and network interface 308, all of which may be coupled by a system bus 310 or a similar mechanism. In some embodiments, computing device 300 may include other components and/or peripheral devices (e.g., detachable storage, sensors, and so on).

Processing system 302 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processing system 302 may be one or more single-core processors. In other cases, processing system 302 may be one or more multi-core processors with multiple independent processing units. Processing system 302 may also include register memory for temporarily storing instructions being executed and related data, as well as cache memory for temporarily storing recently-used instructions and data.

Memory 304 may be any form of computer-usable memory, including but not limited to random access memory (RAM), read-only memory (ROM), and non-volatile memory. This may include flash memory, hard disk drives, solid state drives, rewritable compact discs (CDs), rewritable digital video discs (DVDs), and/or tape storage, as just a few examples.

Computing device 300 may include fixed memory as well as one or more removable memory units, the latter including but not limited to various types of secure digital (SD) cards. Thus, memory 304 can represent both main memory units, as well as long-term storage. Other types of memory may include biological memory.

Memory 304 may store program instructions and/or data on which program instructions may operate. By way of example, memory 304 may store these program instructions on a non-transitory, computer-readable medium, such that the instructions are executable by processing system 302 to carry out any of the methods, processes, or operations disclosed in this specification or the accompanying drawings.

As shown in FIG. 3, memory 304 may include firmware 314A, kernel 314B, and/or applications 314C. Firmware 314A may be program code used to boot or otherwise initiate some or all of computing device 300. Kernel 314B may be an operating system, including modules for memory management, scheduling and management of processes, input/output, and communication. Kernel 314B may also include device drivers that allow the operating system to communicate with the hardware modules (e.g., memory units, networking interfaces, ports, and busses), of computing device 300. Applications 314C may be one or more userspace software programs, such as web browsers or email clients, as well as any software libraries used by these programs. In some examples, applications 314C may include one or more neural network applications and other deep learning-based applications. Memory 304 may also store data used by these and other programs and applications.

Input/output unit 306 may facilitate user and peripheral device interaction with computing device 300 and/or other computing systems. Input/output unit 306 may include one or more types of input devices, such as a keyboard, a mouse, one or more touch screens, sensors, biometric sensors, and so on. Similarly, input/output unit 306 may include one or more types of output devices, such as a screen, monitor, printer, speakers, and/or one or more light emitting diodes (LEDs). Additionally or alternatively, computing device 300 may communicate with other devices using a universal serial bus (USB) or high-definition multimedia interface (HDMI) port interface, for example. In some examples, input/output unit 306 can be configured to receive data from other devices. For instance, input/output unit 306 may receive sensor data from vehicle sensors.

As shown in FIG. 3, input/output unit 306 includes GUI 312, which can be configured to provide information to a remote operator or another user. GUI 312 may involve one or more display interfaces, or another type of mechanism for conveying information and receiving inputs. In some examples, the representation of GUI 312 may differ depending on a vehicle situation. For example, computing device 300 may provide GUI 312 in a particular format, such as a format with a single selectable option for a remote operator to select from.

Network interface 308 may take the form of one or more wireline interfaces, such as Ethernet (e.g., Fast Ethernet, Gigabit Ethernet, and so on). Network interface 308 may also support communication over one or more non-Ethernet media, such as coaxial cables or power lines, or over wide-area media, such as Synchronous Optical Networking (SONET) or digital subscriber line (DSL) technologies. Network interface 308 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 308. Furthermore, network interface 308 may comprise multiple physical interfaces. For instance, some embodiments of computing device 300 may include Ethernet, BLUETOOTH®, and Wifi interfaces. In some embodiments, network interface 308 may enable computing device 300 to connect with one or more vehicles to allow for remote assistance techniques presented herein.

In some embodiments, one or more instances of computing device 300 may be deployed to support a clustered architecture. The exact physical location, connectivity, and configuration of these computing devices may be unknown and/or unimportant to client devices. Accordingly, the computing devices may be referred to as "cloud-based" devices that may be housed at various remote data center locations. In addition, computing device 300 may enable the performance of embodiments described herein, including efficient assignment and processing of sensor data.

Computing device 300 may perform automatic introspection techniques described herein. In some cases, computing device 300 may operate as part of a vehicle's perception system and evaluate performance as the perception system detects objects in the surrounding environment. As such, in some embodiments, computing device 300 may be onboard a vehicle. In other embodiments, computing device 300 may be positioned remotely from the vehicle. In such cases, a computing device 300 may be an individual computing device or it may be a fleet manager device evaluating performance for multiple vehicles within a fleet.

Figure 4:
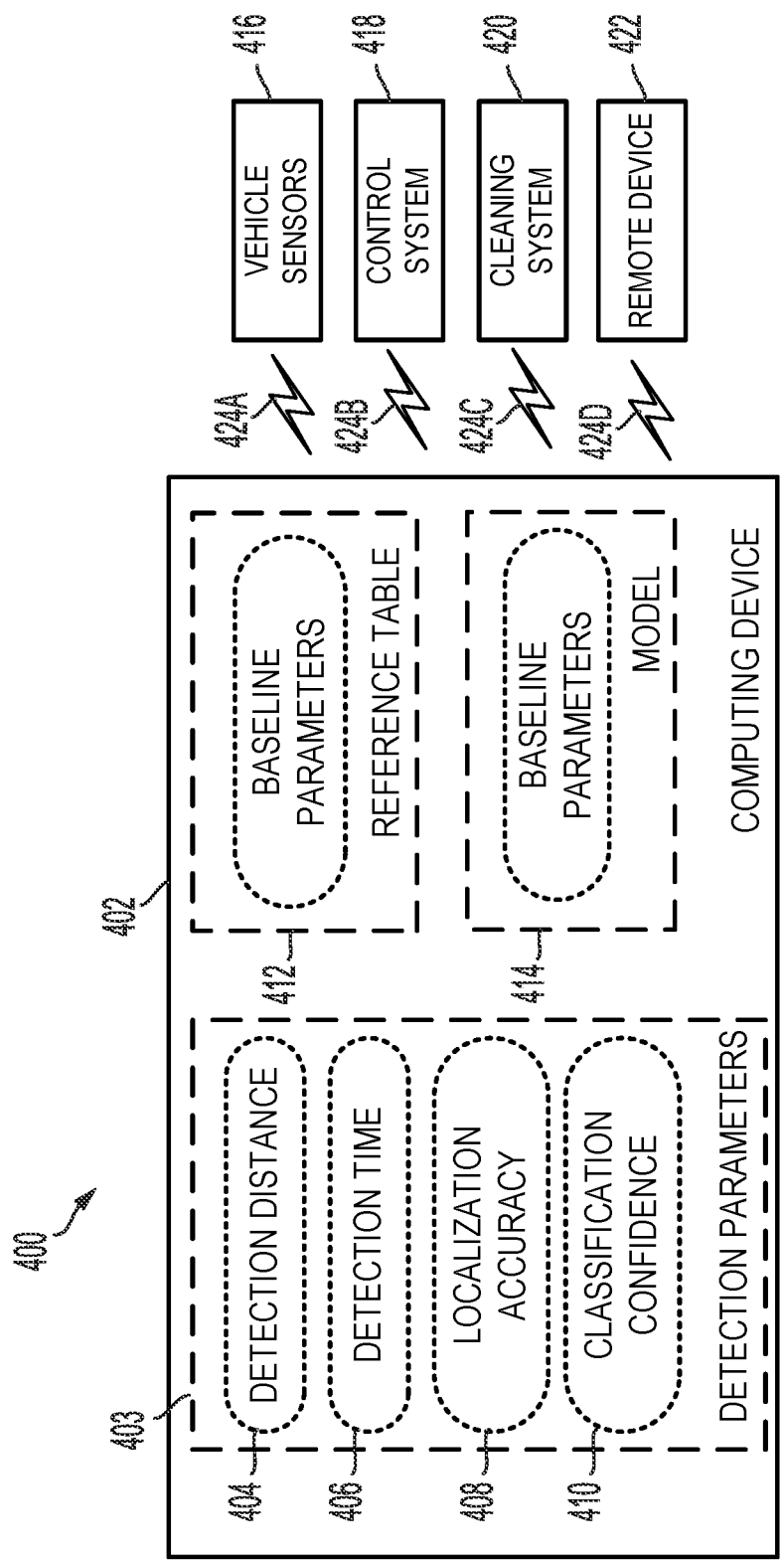
FIG. 4 is a functional block diagram illustrating an automatic introspective perception system, according to one or more example embodiments.

FIG. 4 is a functional block diagram illustrating automatic introspective perception system 400, which can perform operation disclosed herein. As shown in the example embodiment, system 400 includes computing device 402, vehicle sensors 416, control system 418, cleaning system 420, and remote device 422. In other examples, system 400 can include more or fewer components in other arrangements.

Computing device 402 represents one or multiple computing systems, which may involve one or multiple processors performing operations. For instance, computing device 402 can be implemented as computer system 112 in vehicle 100 shown in FIG. 1 or computing device 300 shown in FIG. 3. As such, computing device 402 can operate onboard a truck or another type of vehicle and perform operations using incoming sensor data and other information in real-time. In some embodiments, computing device 402 may also include a remote computing system (e.g., remote device 422) that is communicating wirelessly with onboard computing systems of a vehicle. In addition, computing device 402 may operate as part of a vehicle's perception system and/or in communication with the perception system.

As shown in FIG. 4, computing device 402 may engage in wireless and/or wired communication with vehicle sensors 416 via connection 424A, with control system 418 via connection 424B, with cleaning system 420 via connection 424C, and with remote device 422 via connection 424D. Connections 424A-424D are illustrated in FIG. 4 to represent wired and/or wireless connections and can involve different types of communication technologies within embodiments. In addition, computing device 402 may communicate with other devices or sources not shown in FIG. 4, which can be positioned locally with computing device 402 (e.g., onboard a vehicle) or remote from computing device 402.

In the example embodiment, computing device 402 may obtain sensor data from one or multiple vehicle sensors 416 via connection 424A. For instance, computing device 402 may obtain point clouds from one or multiple lidar units, images (e.g., video) from cameras, sensor data from radar, and other types of sensor data. The sensor data can be received in real-time as the vehicle navigates a path and can be evaluated to analyze individual sensor performance as well as entire sensor system performance. As such, computing device 402 may use incoming sensor data to determine detection parameters 403 associated with the detection and analysis of objects and other surfaces in the surrounding environment. In the example embodiment, detection parameters 403 includes detection distance 404, detection time 406, localization accuracy 408, and classification confidence 410. Detection parameters 403 can include other parameters not shown in FIG. 4. In addition, computing device 402 may use other sources when evaluating sensor data and performance of the perception system, such as high definition maps generated from prior navigation of routes and/or from external sources (e.g., a server).

Detection distance 404 represents the distance to an object upon initial detection of the object by the perception system using sensor data. In some embodiments, detection distance 404 represents the distance between the object and a particular sensor that provided the sensor data used to initially detect the object. For instance, detection distance 404 can represent the distance between a detected vehicle traveling in front of the vehicle using computing device 402 and a forward-facing camera providing images of the detected vehicle. In other embodiments, detection distance 404 represents the distance between the object and a reference point of the vehicle using computing device 402 (e.g., a front portion of the vehicle). The reference point can depend on the position of the detected object relative to the vehicle. For instance, the reference point can differ when the object is positioned in front of the vehicle compared to when the object is positioned to the side or behind the vehicle.

Detection time 406 represents how much time the perception system uses to detect an actual object within the environment upon receiving sensor data that includes measurements of the object. For instance, upon receiving image frames of a video feed captured by a vehicle camera, computing device 402 may quantify a metric of detection time 406 that represents how many milliseconds the perception system used to detect a new object within the image frames.

Localization accuracy 408 represents a metric that conveys how accurately the perception system was able to localize the position of a detected object relative to the sensor and/or vehicle using computing device 402. Localization accuracy 408 can be determined by using sensor data across a duration to obtain multiple measurements of the object as the vehicle navigates in a direction toward or away from the object. In some instances, sensor data from multiple sensors can be used to localize the object relative to the vehicle and/or sensors and determine the localization accuracy 408.

Classification confidence 410 represents a metric that computing device 402 may determine based on how accurate objects are classified by the perception system. Computing device 402 may assign a confidence score (numeric, percentage) that conveys the perception system's confidence in classifications assigned to different objects detected within sensor data. Low classification confidence scores can cause the vehicle to perform unnecessary or undesired maneuvers due to a failure to accurately interpret the surrounding environment.

Computing device 402 may use one or multiple detection parameters 403 to evaluate current performance of the perception system. Evaluation may involve performing a comparison of one or multiple detection parameters 403 to one or more baseline parameters. In addition, detection parameters 403 can be evaluated based on sensor data from one sensor, which allows further analysis of the particular sensor providing the sensor data. In some cases, detection parameters 403 are evaluated based on sensor data from multiple sensors. Such cases may involve analyzing the performance of the perception system overall rather than on a single sensor level.

As shown in FIG. 4, computing device 402 may use baseline parameters to evaluate one or multiple detection parameters 403. The baseline parameters can be generated locally by computing device 402 based on recent analysis by the perception system and/or obtained from other sources. In the example embodiment shown in FIG. 4, the baseline parameters are stored and subsequently obtained by computing device 402 via reference table 412 or model 414. In other embodiments, baseline parameters used to evaluate recent detection parameters 403 can be obtained from other sources, such as remote device 422 via connection 424D.

In some embodiments, baseline parameters are generated locally by computing device 402 based on prior object detection and evaluation by the perception system, which may enable the baseline detection parameters to have a limited availability before being replaced by new baseline parameters that were generated more recently based on more recent object detections. In some embodiments, statistical models may be applied to learn various initial configurations for the autonomous control strategy. For example, a trained machine learning model may be utilized to generate a recommendation whether to responsively execute an autonomous control strategy, which can involve one or more adjustments to an operation of the vehicle.

Figure 5:
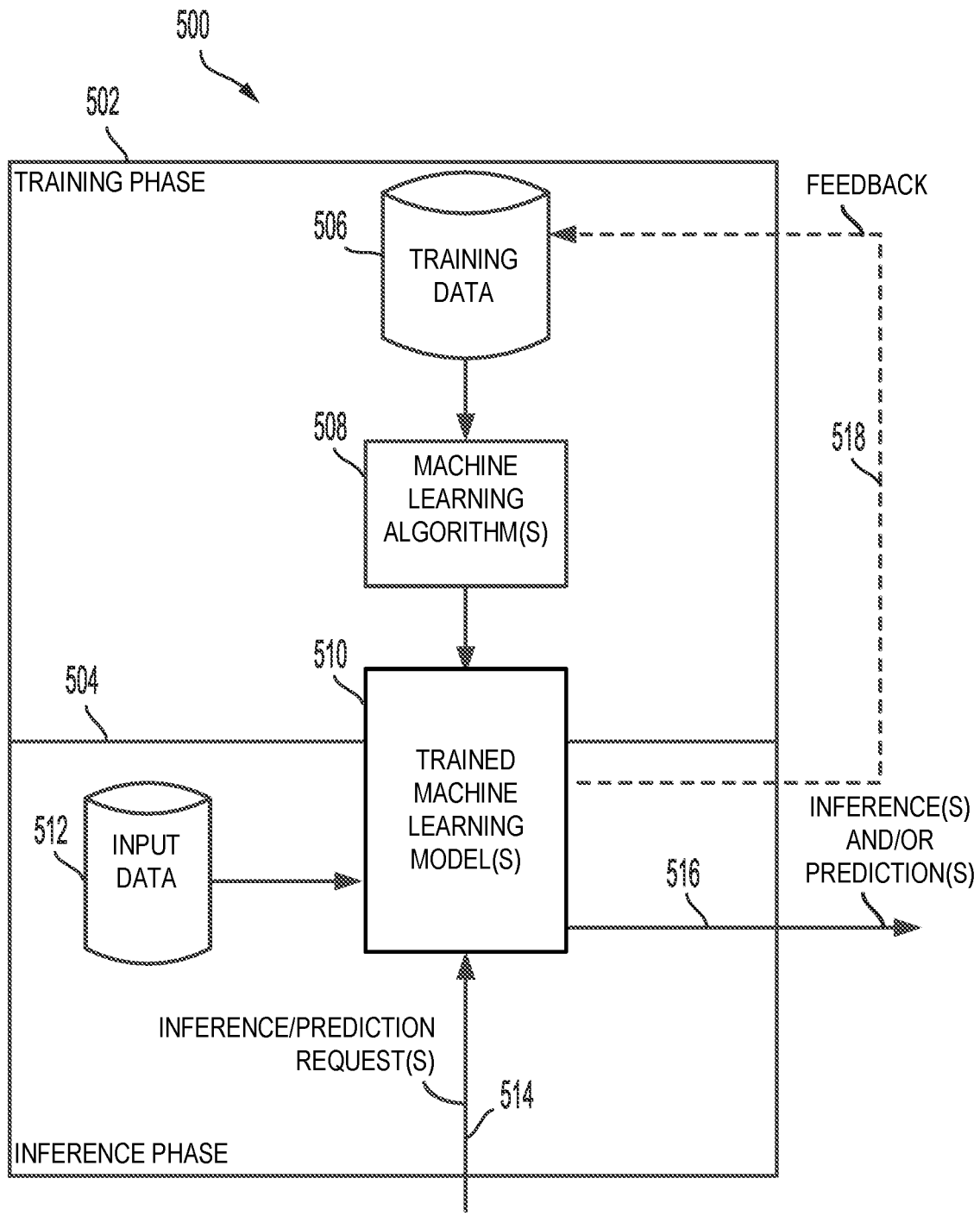
FIG. 5 is a functional block diagram illustrating a training phase and an inference phase for generating a trained machine learning model, according to one or more example embodiments.

FIG. 5 shows diagram 500 illustrating training phase 502 and inference phase 504 of trained machine learning model(s) 510. Disclosed techniques can be used to train one or multiple machine learning model(s) 510 that can be used to convey baseline detection parameters for evaluation of the performance of a perception system.

Some machine learning techniques involve training one or more machine learning algorithms on an input set of training data to recognize patterns in the training data and provide output inferences and/or predictions about (patterns in the) training data. The resulting trained machine learning algorithm can be termed as a trained machine learning model, which may be used for evaluation of a perception system's performance. In the example embodiment, FIG. 5 shows training phase 502 that involves one or more machine learning algorithms 508 being trained on training data 506 to generate trained machine learning model(s) 510. Then, during inference phase 504, trained machine learning model(s) 510 can receive input data 512 and one or more inference/prediction requests 514 (perhaps as part of input data 512) and responsively provide as an output one or more inferences and/or predictions 516.

Trained machine learning model(s) 510 can include one or more models of one or more machine learning algorithms 508. Machine learning algorithm(s) 508 may include, but are not limited to: an artificial neural network (e.g., a convolutional neural network, a recurrent neural network), a Bayesian network, a hidden Markov model, a Markov decision process, a logistic regression function, a support vector machine, a suitable statistical machine learning algorithm, and/or a heuristic machine learning system. In addition, machine learning algorithm(s) 508 may be supervised or unsupervised, and may implement any suitable combination of online and offline learning.

In some examples, machine learning algorithm(s) 508 and/or trained machine learning model(s) 510 can be accelerated using on-device coprocessors, such as graphics processing units (GPUs), tensor processing units (TPUs), digital signal processors (DSPs), and/or application specific integrated circuits (ASICs). Such on-device coprocessors can be used to speed up machine learning algorithm(s) 508 and/or trained machine learning model(s) 510. In some examples, trained machine learning model(s) 510 can be trained, reside on and executed to provide inferences on a particular computing device, and/or otherwise can make inferences for the particular computing device.

During training phase 502, machine learning algorithm(s) 508 can be trained by providing at least training data 506 (e.g., labeled sensor data) as training input using unsupervised, semi-supervised, supervised, and/or reinforcement learning techniques. Unsupervised learning can involve providing a portion (or all) of training data 506 to machine learning algorithm(s) 508 and machine learning algorithm(s) 508 determining one or more output inferences based on the provided portion (or all) of training data 506. In some embodiments, training of the machine learning model may involve unsupervised learning based on a loss function that measures one or multiple detection parameters. Semi-supervised learning involves having correct results for part, but not all, of training data 506. During semi-supervised learning, supervised learning is used for a portion of training data 506 having correct results, and unsupervised learning is used for a portion of training data 506 not having correct results.

Supervised learning involves providing a portion of training data 506 to machine learning algorithm(s) 508, with machine learning algorithm(s) 508 determining one or more output inferences based on the provided portion of training data 506, and the output inference(s) are either accepted or corrected based on correct results associated with training data 506. In some examples, supervised learning of machine learning algorithm(s) 508 can be governed by a set of rules and/or a set of labels for the training input, and the set of rules and/or set of labels may be used to correct inferences of machine learning algorithm(s) 508.

In some instances, models developed through learning can be used to help produce baseline detection parameters for evaluating the performance of a perception system. For example, logged data from executed manual driving strategies, autonomous driving strategies, or both, on highway navigation and other roadways may be utilized for supervised training of machine learning algorithm(s) 508. Data labelers may observe the scene, nearby traffic, and a pose of the autonomous vehicle. Data labelers may then label the situations to help classify and interpret objects in the environment. The labeled scenes can then be used as training data 506 to train machine learning algorithm(s) 508 that would help the autonomous truck make decisions in novel driving scenarios. Supervised learning methods may be similarly applied to simulated data to significantly augment the training data 506. Artificial freeway slow lead agent scenarios may be generated with various geometries, random traffic placements, random agent velocities, and random agent accelerations. The labeled artificial scenes can be used as training data 506 to train machine learning algorithm(s) 508.

Reinforcement learning involves machine learning algorithm(s) 508 receiving a reward signal regarding a prior inference, where the reward signal can be a numerical value. During reinforcement learning, machine learning algorithm(s) 508 can output an inference and receive a reward signal in response, where machine learning algorithm(s) 508 are configured to try to maximize the numerical value of the reward signal. In some examples, reinforcement learning also utilizes a value function that provides a numerical value representing an expected total of the numerical values provided by the reward signal over time. For example, when a discrete decision is to be selected from two or more options or plans, such as, for example, continue to drive in a first lane or change lanes to a second lane, a policy may be constructed that scores each planned trajectory against a rubric of features.

For example, scored features of a trajectory may include (but may not be limited to) a progress made with each trajectory, a difficulty of performing a lane change operation, an amount of acceleration needed by either the autonomous truck or other agents and/or vehicles in the scene, a kinematic comfort of each trajectory, or a minimum predicted buffer provided to other agents and/or vehicles at the scene. The total score for each possible trajectory may be a weighted sum of each scored feature, and the autonomous truck may follow a plan with a lowest score. The respective feature weights may be selected by a variety of automatic and/or heuristic methods. For example, feature weights may be learned from human driving behavior in situations with slow lead agents. Also, for example, for a set of trajectories driven by a human driver in such scenarios, a technique such as inverse reinforcement learning may be applied to compute the set of feature weights. Such an approach helps mimic a logic applied by a human driver.

In some examples, machine learning algorithm(s) 508 and/or trained machine learning model(s) 510 can be trained using other machine learning techniques, including but not limited to, incremental learning and curriculum learning. In some examples, machine learning algorithm(s) 508 and/or trained machine learning model(s) 510 can use transfer learning techniques. For example, transfer learning techniques can involve trained machine learning model(s) 510 being pre-trained on one set of data and additionally trained using training data 506. More particularly, machine learning algorithm(s) 508 can be pre-trained on data from one or more computing devices and a resulting trained machine learning model provided to a particular computing device, where the particular computing device is intended to execute the trained machine learning model during inference phase 504. Then, during training phase 502, the pre-trained machine learning model can be additionally trained using training data 506, where training data 506 can be derived from kernel and non-kernel data of the particular computing device. For instance, kernel data can exist as core components of the operating system of the computing device. This further training of the machine learning algorithm(s) 508 and/or the pre-trained machine learning model using training data 506 of the particular computing device's data can be performed using either supervised or unsupervised learning. Once machine learning algorithm(s) 508 and/or the pre-trained machine learning model has been trained on at least training data 506, training phase 502 can be completed. The trained resulting machine learning model can be utilized as at least one of trained machine learning model(s) 510.

In particular, once training phase 502 has been completed, trained machine learning model(s) 510 can be provided to a computing device, if not already on the computing device. Inference phase 504 can begin after trained machine learning model(s) 510 are provided to the particular computing device.

During inference phase 504, trained machine learning model(s) 510 can receive input data 512 and generate and output one or more corresponding inferences and/or predictions 516 about input data 512. As such, input data 512 can be used as an input to trained machine learning model(s) 510 for providing corresponding inference(s) and/or prediction(s) 516 to kernel components and non-kernel components. For example, trained machine learning model(s) 510 can generate inference(s) and/or prediction(s) 516 in response to one or more inference/prediction requests 516. In some examples, trained machine learning model(s) 510 can be executed by a portion of other software. For example, trained machine learning model(s) 510 can be executed by an inference or prediction daemon to be readily available to provide inferences and/or predictions upon request. Input data 512 can include data from the particular computing device executing trained machine learning model(s) 510 and/or input data from one or more computing devices other than the particular computing device.

Input data 512 can include one or more of real-world driving scenarios, simulated driving scenarios, or both. Various driving scenarios may be generated with various geometries, random traffic placements, random agent velocities, and/or random agent accelerations. Other types of input data are possible as well. Input data 512 can be labeled images that indicate a preference for a lane change or not, or that select a driving strategy from one or more available strategies. As such, detection parameters can be extracted and evaluated based on different conditions, including changes in weather conditions, terrain, speed limits, traffic levels, types of objects, etc.

Inference(s) and/or prediction(s) 516 can include output navigation plans, output driving strategies, and/or other output data produced by trained machine learning model(s) 510 operating on input data 512 (and training data 506). In some embodiments, output inference(s) and/or prediction(s) 516 may include predicted navigation plans of other vehicles (such as a vehicle that has a high probability of an interaction with the autonomous truck, a merging vehicle, and so forth). In some examples, trained machine learning model(s) 510 can use output inference(s) and/or prediction(s) 516 as input feedback 518. Trained machine learning model(s) 510 can also rely on past inferences as inputs for generating new inferences.

Deep neural nets for determining lane change strategies can be examples of machine learning algorithm(s) 508. After training, the trained version of deep neural nets can be examples of trained machine learning model(s) 510. In this approach, an example of inference/prediction request(s) 516 can be a request to predict a driving strategy for an input scenario involving various nearby agents (e.g., other vehicles, pedestrians) and corresponding example of inferences and/or prediction(s) 516 can be an output driving strategy.

Figure 6:
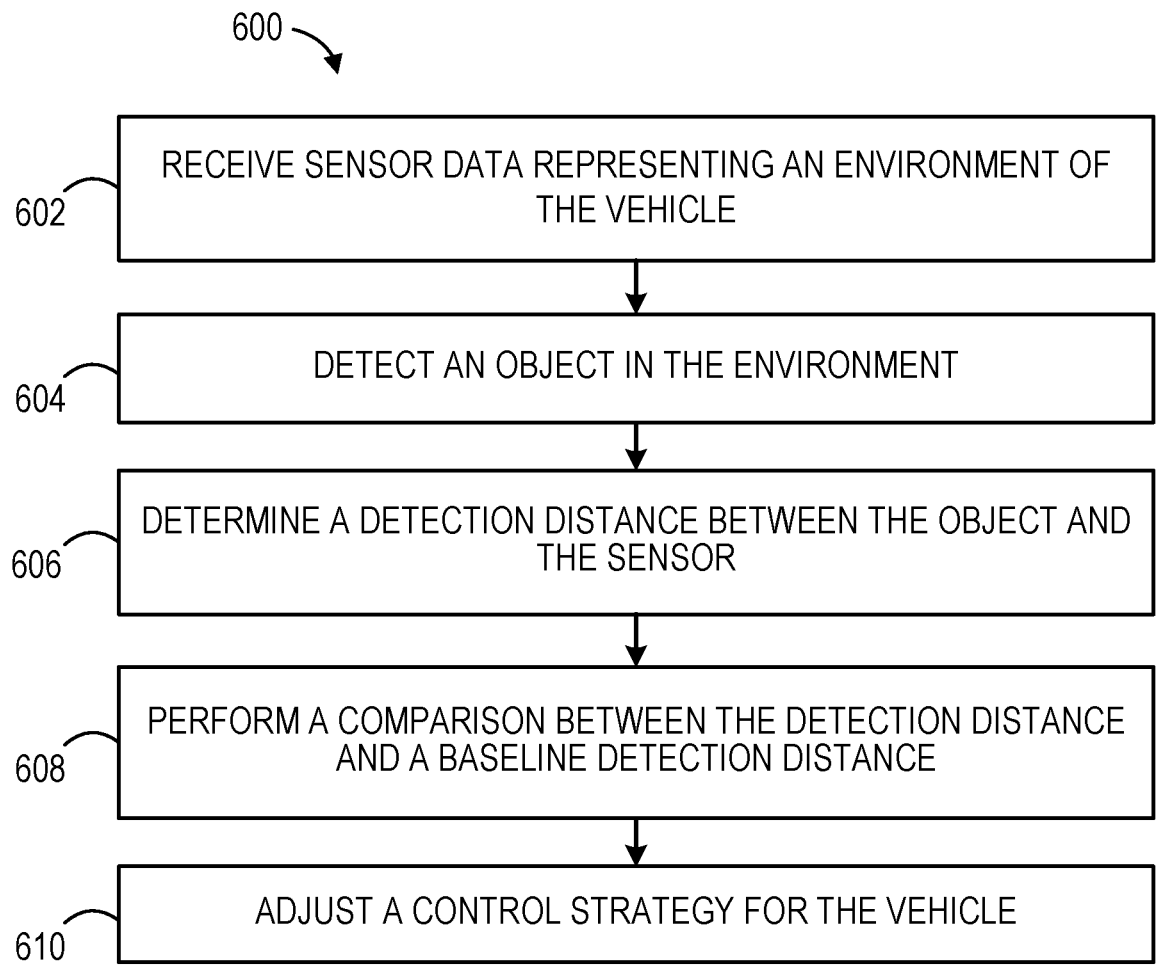
FIG. 6 is a flowchart of a method for automatic introspection of a perception system, according to one or more example embodiments.

FIG. 6 is a method for automatic introspection. Method 600 represents an example method that may include one or more operations, functions, or actions, as depicted by one or more of blocks 602, 604, 606, 608, and 610, each of which may be carried out by any of the systems, devices, and/or vehicles shown in FIGS. 1-5, among other possible systems. For instance, computing device 300 depicted in FIG. 3 or computing device 402 shown in FIG. 4 may perform method 600.

Those skilled in the art will understand that the flowchart described herein illustrates functionality and operations of certain implementations of the present disclosure. In this regard, each block of the flowchart may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as may be understood by those reasonably skilled in the art.

At block 602, method 600 involves receiving sensor data representing an environment of a vehicle. For instance, a computing system may receive sensor data from a sensor coupled to the vehicle as the vehicle navigates a path. In some embodiments, the computing system receives sensor data from multiple sensors coupled to the vehicle. In addition, the computing system can also receive sensor data from external sensors that are positioned remotely from the vehicle.

At block 604, method 600 involves detecting, based on the sensor data, an object in the environment. The computing system can use computer vision or other processing techniques to detect objects within sensor data.

At block 606, method 600 involves determining a detection distance between the object and the sensor. The computing system may determine the detection distance to the object responsive to detecting the object.

In some examples, the computing system may determine a detection confidence for the object exceeds a threshold confidence. The detection confidence may represent a confidence level (e.g., numeric or percent) that the computing system assigns to the object when attempting to identify the object and/or confirm the object is real. For instance, the computing system may initially detect an object and subsequently identify the object after obtaining subsequent data and moving closer toward the object. When the detection confidence of the object exceeds the threshold confidence level, the computing system may determine the detection distance between the object and the sensor.

At block 608, method 600 involves performing a comparison between the detection distance and a baseline detection distance. The baseline detection distance depends on one or more prior detections of given objects that are in a classification group comprising the object. The computing system may determine a classification group for the object and identify the baseline detection distance based on the classification group. In some cases, the baseline detection distance is generated based on a plurality of prior detections performed during navigation of the path by the vehicle. In addition, the baseline detection distance can also depend on one or more weather conditions of the environment.

In some examples, the computing system obtains the baseline detection distance from a reference table. The reference table can include at least a first baseline detection distance corresponding to a first classification group and a second baseline detection distance corresponding to a second classification group. As such, objects in the first classification group differ from objects in the second classification group. For instance, the first classification group can correspond to vehicles and the second classification group can correspond to traffic signs in some examples.

In some examples, the computing system obtains the baseline detection distance from a remote computing device. For instance, the remote computing device could have generated the baseline detection distance based on respective detection distances provided by a plurality of vehicles traveling within a threshold distance of the vehicle.

In some examples, the computing system receives point cloud data from a LIDAR unit coupled to the vehicle. The baseline detection distance further depends on one or more prior detections of given objects based on point cloud data from the LIDAR unit. The computing system may receive images from a camera coupled to the vehicle. The baseline detection distance further depends on one or more prior detections of given objects based on sensor data from the camera.

At block 610, method 600 involves adjusting, based on the comparison, a control strategy for the vehicle. As an example, the computing system may determine a difference between the detection distance and the baseline detection distance based on the comparison. Based on the difference exceeding a threshold difference, the computing system may cause the vehicle to increase or decrease speed. In some cases, based on the difference exceeding a threshold difference, the computing system may trigger at least a cleaning process or a calibration process for the sensor.

In some examples, the computing system may determine, based on the sensor data, at least two weather conditions corresponding to the environment and adjust the control strategy based on a combination of the at least two weather conditions. For instance, the computing system may use a multi-dimensional model that predicts adjustments to control strategy based on the detection of weather conditions that may impact normal navigation. As an example, weather conditions can include snow, rain, fog, and high winds, among others. Multiple weather conditions that impact typical navigation may trigger the vehicle to increase a buffer maintained during navigation as well as perform some techniques more deliberately (e.g., slower turns and deceleration earlier when stopping).

In some embodiments, the computing system determines a first detection distance between the object and the sensor where the first detection distance is based on an initial detection of the object. The computing system also subsequently determines that a detection confidence for the object exceeds a threshold confidence and, based on determining that the detection confidence for the object exceeds the threshold confidence, determines a second detection distance between the object and the sensor. The computing system can then perform a first comparison between the first detection distance and a first baseline detection distance, where the first baseline depends on one or more prior initial detections of given objects that are in the classification group comprising the object. The computing system may also perform a second comparison between the second detection distance and a second baseline detection distance, where the second detection distance depends on at least one prior detection of a particular object with a given detection confidence that exceeded the threshold confidence and the particular object is in the classification group comprising the object. As such, the computing system can then adjust the control strategy based on the first comparison and the second comparison.

In some examples, the computing system may receive sensor data from a plurality of sensors coupled to the vehicle that includes the sensor. The computing system may detect a plurality of objects based on the sensor data from the plurality of sensors and determine, for each detected object, a given detection distance between the detected object and the vehicle. The computing system may then generate a plurality of baseline detection distances based on respective detection distances associated with detecting the plurality of objects. The plurality of baseline detection distances includes at least a first baseline detection distance corresponding to a first classification group and a second baseline detection distance corresponding to a second classification group. As such, objects in the first classification group differ from objects in the second classification group. As an example, the first classification group can correspond to vehicles and the second classification group can correspond to traffic signs. In general, some example classification groups include vehicles, pedestrians, traffic signs, road markings, and other objects encountered during navigation. In addition, these classification groups can be further divided into subclassification groups in some example embodiments. For instance, the computing system may use some baselines for passenger vehicles and other baselines for trucks and other larger vehicles.

In some examples, the computing system may detect, based on the sensor data, a second object located in the environment and determine a second detection distance between the second object and the sensor responsive to detecting the second object. The computing system may then perform a second comparison between the second detection distance and the baseline detection distance and adjust the control strategy of the vehicle further based on the second comparison.

In some examples, the computing system may receive sensor data from a plurality of sensors coupled to the vehicle that includes the sensor and generate a machine learning model based on the sensor data. In some cases, the machine learning model uses the sensor data to group objects according to classification groups and generates a baseline detection distance corresponding to each classification group. The computing system can then use the machine learning model to obtain baseline detection distances for comparisons. In some embodiments, the machine learning model is also used to determine control strategy for the vehicle and when to trigger cleaning systems and/or calibration systems.

In some examples, the computing system may modify at least one baseline detection distance in the reference table based on the detection distance between the object and the sensor. The reference table is stored in memory located onboard the vehicle in some examples. In other examples, the reference table is distributed between local memory located onboard the vehicle and remote memory located on a remote device (e.g., a server).

In some examples, the computing system determines a detection time associated with detecting the object responsive to detecting the object. The detection time represents a duration between an initial detention of the object and a subsequent detection of the object when a classification confidence for the object exceeds a threshold confidence. The computing system may then perform a second comparison between the detection time associated with detecting the object and a baseline detection time. The baseline detection time can depend on one or more prior detection times associated with detecting given objects in the classification group that includes the object.

In some examples, the computing system determines a localization accuracy associated with detecting the object responsive to detecting the object. The localization accuracy depends on at least subsequent sensor data from the sensor or sensor data from a second sensor coupled to the vehicle. The computing system performs a second comparison between the localization accuracy associated with detecting the object and a baseline localization accuracy. The baseline localization accuracy depends on one or more prior localization accuracies associated with detecting given objects in the classification group that includes the object.

In some examples, the computing system may determine that no objects have been detected in sensor data for a threshold duration since the last object detection. As an example result, the computing system may adjust vehicle behavior until detecting another object in sensor data.

Figure 7:
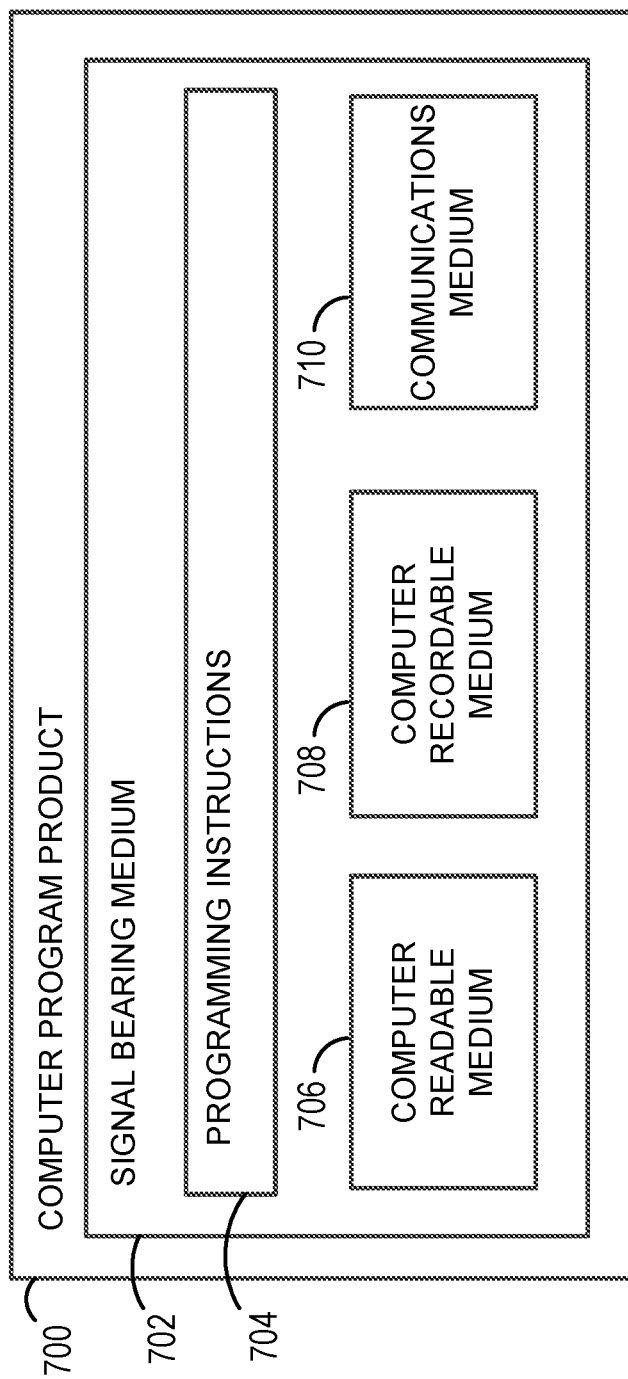
FIG. 7 is a schematic diagram of a computer program, according to one or more example embodiments.

FIG. 7 is a schematic illustrating a conceptual partial view of an example computer program product that includes a computer program for executing a computer process on a computing device, arranged according to at least some embodiments presented herein. In some embodiments, the disclosed methods may be implemented as computer program instructions encoded on a non-transitory computer-readable storage media in a machine-readable format, or on other non-transitory media or articles of manufacture.

Example computer program product 700 may be provided using signal bearing medium 702, which may include one or more programming instructions 704 that, when executed by one or more processors may provide functionality or portions of the functionality described above with respect to FIGS. 1-6. In some examples, the signal bearing medium 702 may encompass non-transitory computer-readable medium 706, such as, but not limited to, a hard disk drive, a Compact Disc (CD), a Digital Video Disk (DVD), a digital tape, memory, solid state drive (SSD) etc. In some implementations, the signal bearing medium 702 may encompass a computer recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, the signal bearing medium 702 may be conveyed by a wireless form of the communications medium 710.

The one or more programming instructions 704 may be, for example, computer executable and/or logic implemented instructions. In some examples, a computing device such as the computer system 112 of FIG. 1 may be configured to provide various operations, functions, or actions in response to the programming instructions 704 conveyed to the computer system 112 by one or more of the computer readable medium 706, the computer recordable medium 708, and/or the communications medium 710.

The non-transitory computer readable medium could also be distributed among multiple data storage elements, which could be remotely located from each other. The computing device that executes some or all of the stored instructions could be a vehicle, such as vehicle 200 illustrated in FIG. 2A-2D, among other possibilities. Alternatively, the computing device that executes some or all of the stored instructions could be another computing device, such as a server.

Figure 8:
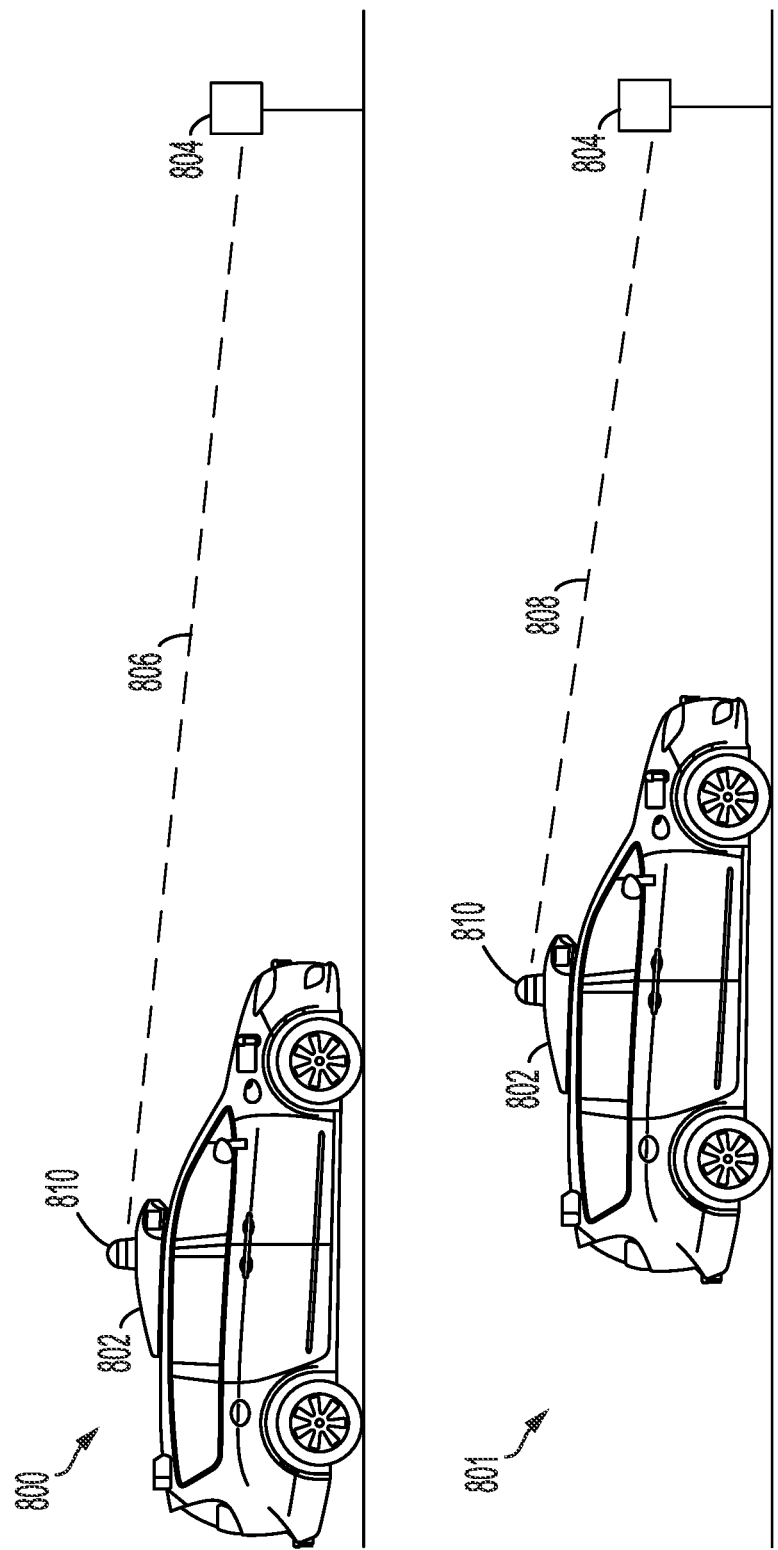
FIG. 8 depicts a vehicle performing automatic introspection, according to one or more example embodiments.

FIG. 8 depicts vehicle 802 performing automatic introspection operations disclosed herein. At a first time 800, vehicle 802 is shown initially detecting traffic sign 804 at detection distance 806 relative to sensor 810. In particular, vehicle 802 may use one or multiple sensors to obtain sensor data representing the environment, such as cameras, lidar, and/or radar, etc. In the example embodiment, sensor 810 is a lidar sensor positioned on top of vehicle 802. In other examples, sensor 810 can be a different type of sensor. In addition, detection distance 806 can be measured relative to vehicle 802 in some examples.

Vehicle 802 may perform disclosed operations herein to check if detection distance 806 associated with initially detecting traffic sign 804 is accurate relative to prior initial detection distances of traffic signs. For instance, when the environment is foggy, rainy, or other weather conditions that impact sensor measurements, vehicle 802 may determine that detection distance 806 is less than a baseline detection distance that represents typical measurements in clear weather conditions.

At a second time 801, vehicle 802 is shown detecting traffic sign 804 at detection distance 808 relative to sensor 810. Detection distance 808 may represent a distance between sensor 810 and traffic sign 804 when vehicle 802 determines that traffic sign 804 is real above a threshold confidence and/or classifies traffic sign 804 as a traffic sign with a confidence above a threshold confidence. As such, vehicle 802 may perform disclosed techniques to check detection confidence relative to past detections of signs. For instance, detection distance 808 can be compared to one or multiple baselines associated with detecting similar traffic signs above the threshold confidence. This way, vehicle 802 can check on performance of perception in real-time as vehicle 802 navigates toward a destination.

In some cases, vehicle 802 may use techniques herein to adjust control strategy. For instance, vehicle 802 may decrease speed when disclosed techniques show that the perception system is detecting traffic sign 804 at closer distances due to environmental conditions or some other issue. In some cases, vehicle 802 may perform disclosed techniques and determine that sensor 810 requires calibration and/or cleaning. As such, vehicle 802 may trigger calibration and/or cleaning processes based on real-time analysis of detection parameters, such as detection distance, confidence, and/or localization accuracy.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

What is claimed is:

1. A method comprising:
    receiving, at a computing system and from a sensor coupled to a vehicle, sensor data representing an environment of the vehicle as the vehicle navigates a path;
    detecting, based on the sensor data, an object in the environment;
    responsive to detecting the object, determining a detection distance between the object and the sensor;
    performing, by the computing system, a comparison between the detection distance and a baseline detection distance, wherein the baseline detection distance depends on one or more prior detections of given objects that are in a classification group comprising the object; and
    adjusting, based on the comparison, a control strategy for the vehicle by performing a cleaning operation at the sensor or adjusting a speed of the vehicle.

2. The method of claim 1, wherein determining the detection distance between the object and the sensor comprises:
    determining a first detection distance between the object and the sensor, wherein the first detection distance is based on an initial detection of the object;
    determining that a detection confidence for the object exceeds a threshold confidence; and
    based on determining that the detection confidence for the object exceeds the threshold confidence, determining a second detection distance between the object and the sensor.

3. The method of claim 2, wherein performing the comparison between the detection distance and the baseline detection distance comprises:
    performing a first comparison between the first detection distance and a first baseline detection distance, wherein the first baseline detection distance depends on one or more prior initial detections of given objects that are in the classification group comprising the object; and
    performing a second comparison between the second detection distance and a second baseline detection distance, wherein the second detection distance depends on at least one prior detection of a particular object with a given detection confidence that exceeded the threshold confidence, and wherein the particular object is in the classification group comprising the object.

4. The method of claim 3, wherein adjusting the control strategy comprises:
    adjusting the control strategy based on the first comparison and the second comparison.

5. The method of claim 1, further comprising:
    based on detecting the object, determining a detection confidence for the object exceeds a threshold confidence; and
    based on determining the detection confidence for the object exceeds the threshold confidence, determining the detection distance between the object and the sensor.

6. The method of claim 1, wherein detecting the object further comprises:
    determining a classification group for the object; and
    identifying, based on the classification group, the baseline detection distance.

7. The method of claim 6, wherein identifying the baseline detection distance comprises:
    obtaining the baseline detection distance from a reference table,
    wherein the reference table comprises at least a first baseline detection distance corresponding to a first classification group and a second baseline detection distance corresponding to a second classification group, and
    wherein objects in the first classification group differ from objects in the second classification group.

8. The method of claim 7, wherein the first classification group corresponds to vehicles and the second classification group corresponds to traffic signs.

9. The method of claim 7, further comprising:
    modifying at least one baseline detection distance in the reference table based on the detection distance between the object and the sensor, wherein the reference table is stored in memory located onboard the vehicle.

10. The method of claim 1, further comprising:
    obtaining the baseline detection distance from a remote computing device, wherein the remote computing device generated the baseline detection distance based on respective detection distances provided by a plurality of vehicles traveling within a threshold distance of the vehicle.

11. The method of claim 1, further comprising:
    responsive to detecting the object, determining a detection time associated with detecting the object, wherein the detection time represents a duration between an initial detection of the object and a subsequent detection of the object when a classification confidence for the object exceeds a threshold confidence; and performing a second comparison between the detection time associated with detecting the object and a baseline detection time, wherein the baseline detection time depends on one or more prior detection times associated with detecting given objects in the classification group comprising the object.

12. The method of claim 1, further comprising:
responsive to detecting the object, determining a localization accuracy associated with detecting the object, wherein the localization accuracy depends on at least one of: (i) subsequent sensor data from the sensor or (ii) sensor data from a second sensor coupled to the vehicle; and
performing a second comparison between the localization accuracy associated with detecting the object and a baseline localization accuracy, wherein the baseline localization accuracy depends on one or more prior localization accuracies associated with detecting given objects in the classification group comprising the object.

13. The method of claim 1, further comprising:
determining, based on the comparison, a difference between the detection distance and the baseline detection distance; and
based on the difference exceeding a threshold difference, causing the vehicle to decrease speed.

14. The method of claim 1, further comprising:
determining, based on the comparison, a difference between the detection distance and the baseline detection distance; and
based on the difference exceeding a threshold difference, triggering at least a cleaning process or a calibration process for the sensor.

15. The method of claim 1, wherein receiving sensor data representing the environment of the vehicle comprises:
receiving point cloud data from a LIDAR unit coupled to the vehicle, wherein the baseline detection distance further depends on one or more prior detections of given objects based on point cloud data from the LIDAR unit.

16. The method of claim 1, wherein adjusting, based on the comparison, the control strategy for the vehicle comprises:
determining, based on the sensor data, at least two weather conditions corresponding to the environment; and
adjusting the control strategy based on a combination of the at least two weather conditions.

17. The method of claim 1, further comprising:
receiving sensor data from a plurality of sensors coupled to the vehicle, wherein the plurality of sensors includes the sensor;
detecting a plurality of objects based on the sensor data from the plurality of sensors;
determining, for each detected object, a given detection distance between the detected object and the vehicle; and
generating a plurality of baseline detection distances based on respective detection distances associated with detecting the plurality of objects, wherein the plurality of baseline detection distances comprises at least a first baseline detection distance corresponding to a first classification group and a second baseline detection distance corresponding to a second classification group, and wherein objects in the first classification group differs from objects in the second classification group.

18. The method of claim 1, further comprising:
receiving sensor data from a plurality of sensors coupled to the vehicle, wherein the plurality of sensors includes the sensor;
generating a machine learning model based on the sensor data, wherein the machine learning model uses the sensor data to group objects according to classification groups and generates a baseline detection distance corresponding to each classification group; and
wherein identifying the baseline detection distance comprises:
obtaining the baseline detection distance based on the machine learning model.

19. A system comprising:
a vehicle having at least a sensor;
a computing device configured to:
receive, from the sensor, sensor data representing an environment of the vehicle as the vehicle navigates a path;
detect, based on the sensor data, an object in the environment;
responsive to detecting the object, determine a detection distance between the object and the sensor;
perform a comparison between the detection distance and a baseline detection distance, wherein the baseline detection distance depends on one or more prior detections of given objects that are in a classification group comprising the object; and
adjust, based on the comparison, a control strategy for the vehicle by performing a cleaning operation at the sensor or adjusting a speed of the vehicle.

20. A non-transitory computer readable medium configured to store instructions, that when executed by a computing device, causes the computing device to perform operations comprising:
receiving, from a sensor coupled to a vehicle, sensor data representing an environment of the vehicle as the vehicle navigates a path;
detecting, based on the sensor data, an object in the environment;
responsive to detecting the object, determining a detection distance between the object and the sensor;
performing a comparison between the detection distance and a baseline detection distance, wherein the baseline detection distance depends on one or more prior detections of given objects that are in a classification group comprising the object; and
adjusting, based on the comparison, a control strategy for the vehicle by performing a cleaning operation at the sensor or adjusting a speed of the vehicle.

* * * * *